Patented Oct. 9, 1951

2,570,866

UNITED STATES PATENT OFFICE 2,570,866

REDUCTION OF NITROARYL COMPOUNDS

Donald E. Sargent and George Wesley Pedlow, Jr., Easton, Pa., assignors to General Aniline & Film Corporation, New York, N. Y., a corporation of Delaware No Drawing. Application October 19, 1948, Serial No. 55,426

17 Claims. (Cl. 260—518)

The present invention relates to the reduction of nitroaryl compounds in an alkaline system while utilizing as the reducing agent aluminum in combination with small amounts of a zinc compound.

The reduction of nitroaryl compounds to the corresponding azoxy, azo and hydrazo compounds in an alkaline medium is well known in the art. It is usually recommended that such reduction be effected by the utilization of zinc dust as the reducing agent, the zinc dust being generally added portionwise to a hot mixture of the nitro compound and an alkali, preferably sodium hydroxide. The hydrazo compound which causes is then usually subjected to a rearrangement to the corresponding benzidine-type compounds by means of a strong mineral acid.

Manifold objections present themselves to the utilization of the zinc dust as the effective reducing agent. Thus large quantities of the same must be employed, rendering the process relatively expensive. Zinc dust is also rather difficult to handle and poses problems from a health standpoint due to its tendency to disseminate in the air breathed by the operators. Furthermore the zinc appears in the final stage of the reaction as a solid compound, and inasmuch as the hydrazo compound is likewise solid, difficulties are encountered in separating the two solids to obtain the hydrazo compound in a pure state.

These disadvantages in connection with the utilization of zinc dust as the reducing agent in reactions of the type under consideration, can be overcome by the utilization of aluminum metal as the reducing agent. Theoretically, aluminum metal should be more efficient (on a weight basis) and less expensive than zinc because its equivalent weight is only approximately 9, compared to about 32.7 for zinc. Thus only about 9 parts of aluminum are required to furnish one part of hydrogen whereas 32.7 parts of zinc are needed. Despite the fact that aluminum costs about 1½ times as much as zinc, a substantial saving would be effected because so much less of the aluminum is needed.

Theoretically, if aluminum alone were suitable for use as a reducing agent, the reactions which would be involved in the reduction of the nitroaryl compound, taking nitrobenzene as an example, would be as follows:

(1)

$6C_6H_5NO_2 + 4Al + 4NaOH \longrightarrow 6C_6H_5NO + 4NaAlO_2 + 2H_2O$
Nitrosobenzene (2)

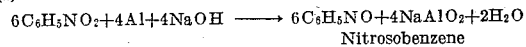
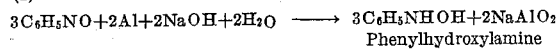
Phenylhydroxylamine (3)

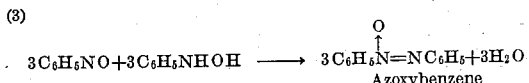
Azoxybenzene (4)

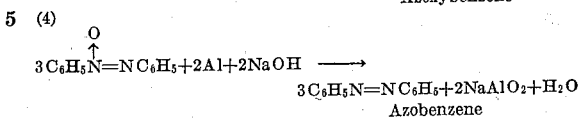
Azobenzene (5)

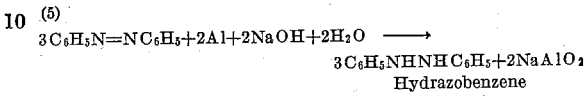
Hydrazobenzene

Equations 1, 2, 3, 4 and 5 may be combined to give the general equation:

(6)

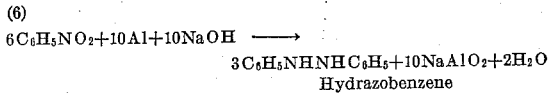
Hydrazobenzene

It is apparent from this general equation that 738 parts of nitrobenzene can be reduced to the corresponding hydrazo compound by the employment of only 269.6 parts of aluminum.

Unfortunately, however, aluminum metal alone is not an efficient reducing agent for alkali-insoluble nitroaryl compounds in alkaline systems for the reason that it has a great tendency to react with alkalis, such as sodium hydroxide, with the liberation of hydrogen instead of reduction of the nitroaryl compound.

We have now discovered, surprisingly enough, that the addition of small amounts, i. e., practically catalytic amounts, of zinc compounds causes the nitroaryl compounds to be efficiently reduced by aluminum metal in alkaline systems. The reduction of nitroaryl compounds to the azoxy-, azo- and hydrazoaryl compounds in an alkaline medium by means of aluminum metal and a small amount of a zinc compound accordingly constitute the purposes and objects of the present invention.

The reduction of the nitroaryl compounds may be carried out in a jacketed iron or other suitable kettle equipped with a reflux condenser and which is charged with the nitroaryl compound, water, a zinc compound, and a water-soluble inorganic alkali such as sodium hydroxide. The charge is agitated and brought to the desired temperature range at which the reduction is to be effected. Aluminum metal is then added portionwise to the reaction mixture over a period which may consume several hours. The contents of the reactor first become yellow, then orange, and then a reddish-tan. Finally the solid hydrazoaryl compound forms. This gradually lightens in color and becomes white as the last of the azoaryl is reduced. The resulting aqueous slurry is then poured on to a screen or other filtering device whereby the alkaline mother liquid passes through and the hydrazo compound is retained on the screen. The last of the alkali and aluminum salts formed in the reduction are removed by washing with water. The hydrazo compound may be dried and isolated as such, or converted into benzidine-type compounds in the usual manner by treatment with a strong mineral acid.

The aluminum metal which is utilized in this reduction procedure may be of various types, such as aluminum dust, cut sheet, wire, pellets, grains, or the like. Preferably, however, there are employed either thin cut sheets of a size of .01 to .03 inch thick or 8 to 30 mesh grained aluminum. Since the process works effectively with the coarse metal, it has the advantage over zinc, where the dust is used, because of the obviation of fire and health hazards. Commercial grades of aluminum containing small percentages of copper, iron silicon, manganese and magnesium have been found to be quite useful.

The zinc compound which is employed in connection with the aluminum to effect the reduction may be zinc metal (e. g. zinc dust) or any of the ordinarily available zinc compounds, such as zinc oxide, zinc hydroxide, zinc sulfate, zinc chloride, zinc nitrate, zinc acetate, zinc oxalate, and the like. The quantity of the zinc compound is, as stated, very small, ranging from about .5 to about 6% by weight of the nitroaryl compound utilized as the parent material. Most economical results are obtained when using zinc dust or zinc oxide, and the utilization of these materials is accordingly preferred. It appears that zinc or any zinc compound capable of dissolving in the alkaline reaction medium would tend to catalyze the reaction, except that salts containing sulfide ion act as poisons. It is possible that the zincate formed in the alkaline medium is the form of zinc that is the active catalyst.

The particular function exerted by the zinc compound in connection with the aluminum is not known and has not been ascertained. Inasmuch as the zinc compound is used in practically catalytic amounts, it is possible that its function is likewise catalytic. Nevertheless it appears that the zinc compound enters into the reaction and probably provides an auxiliary, reversible oxidation-reduction process which allows the overall reaction to proceed. While, as stated, the particular function is not known, the following theory may help to explain the role played by the zinc compound. It is to be understood, however, that the subsequent representations are merely theoretical and hence not a limitation on the invention.

When a zinc compound, such as zinc oxide, is placed in an alkaline system containing sodium hydroxide, it is converted to sodium zincate as per the following reaction:

(1) $\quad ZnO + 2NaOH \rightarrow Na_2ZnO_2 + H_2O$

When aluminum metal is added to the system, zinc immediately precipitates on the surface of the aluminum as follows:

(2)

$2Al + 3Na_2ZnO_2 + 2H_2O \rightarrow 3Zn + 2NaAlO_2 + 4NaOH$ or (3) $\quad 2Al + 3Na_2ZnO_2 \rightarrow 3Zn + 2Na_3AlO_3$ It may be that this thin coating of zinc on the surface of the aluminum is the actual reducing agent instead of the aluminum metal, according to the following equation:

(4) $2C_6H_5NO_2 + 5Zn + 10NaOH \rightarrow$
$\quad\quad C_6H_5NHNHC_6H_5 + 5Na_2ZnO_2 + 4H_2O$ The sodium zincate so produced can then be immediately reduced to zinc according to Equations 2 or 3 and the process repeated until all of the aluminum metal has been consumed. If this be the case we may be dealing with a zinc reduction in which the zinc is constantly regenerated by the aluminum metal. Any aluminum or zinc metal remaining after the reduction of the nitroaryl compound is completed is converted to soluble products according to the following equations:

(5) $\quad 2Al + 2NaOH + 2H_2O \rightarrow NaAlO_2 + 3H_2$ (6) $\quad 2Al + 6NaOH \rightarrow 2Na_3AlO_3 + 3H_2$ (7) $\quad Zn + 2NaOH \rightarrow Na_2ZnO_2 + H_2$ Whether or not this be the actual mechanism of the reaction, the fact remains that the reduction is effected by the aluminum in conjunction with zinc or the zinc compound. If zinc metal is used as the catalyst, the quantity of zinc employed is insufficient for complete reduction and the aluminum alone is incapable of effecting the reduction. Furthermore, zinc compounds by themselves are incapable of reducing nitroaryl compounds.

The temperature at which the reduction is effected may vary from 0 to 100° C. but the preferred range is from 25 to 80° C. The reaction is exothermic and the temperature may be adjusted by the rate of addition of the aluminum metal to the reaction mixture.

The process is effective with any of the nitroaryl compounds e. g., nitrobenzene, o-, m-, and p-nitrotoluene, o-, m-, and p-nitroanisole, o-, m-, and p-nitrochlorbenzene, o-, m-, and p-nitrobenzenesulfonic acid, o-, m-, and p-nitrophenetole, o-, m-, and p-nitrobenzoic acid, o-, m-, and p-nitrobenzylamine, o-, m-, and p-nitrobromobenzenes, 1- or 3-nitrocarbazole, 2-, 3-, and 4-nitrodiphenyl ether, 2-, 3-, and 4-nitrodiphenylamine, 2- and 3-nitrofluorene, 2-, 3- and 4-nitrofluorenone, 1-, 2- and 3-nitrodiphenylene oxide, m-nitrophenol, 5-, 6-, 7-, and 8-nitroquinoline, 5 - nitroacenaphthene, 6 - nitroacenaphthene-3-sulfonic acid, p-nitrodiphenyl, 1-nitronaphthalene, 2-nitronaphthalene, o- and p-nitrobiphenyl, p-nitrobenzophenone, p-nitroacetophenone, o-, m- and p-nitroaniline, 1-nitroanthracene, 2-nitrodiphenylmethane, 9-nitrophenanthrene, 1-nitroanthraquinone, 2-nitrophenoxyacetic acid, 3-nitrobenzanthrone, o-, m- and p-nitro-trifluoromethylbenzene, and the like.

The reaction is effective with an aqueous alkaline solution but it is preferable to utilize a water-soluble organic solvent since it has been found to expedite the reduction. As such a solvent there should be employed a water-soluble alcohol, ether-alcohol or ethers such as methanol, ethanol, isopropanol, ethylene glycol, ethylene glycol monoethyl ethers, polyethyleneglycol, dioxane, methylal and the like. The quantity of the solvent will generally range from about 25 to 125% by weight of the nitroaryl compound subjected to reduction.

The importance of the utilization of solvents is particularly emphasized where the compound which is undergoing reduction is nitrobenzene itself. It has been found, and this constitutes an important part of our invention, that when using methanol in the reduction of nitrobenzene, the methanol-sodium hydroxide is capable per se of furnishing the hydrogen necessary for converting the nitrobenzene to azoxy-benzene. The azoxy-benzene is then reduced to the hydrazo benzene by use of the aforementioned aluminum reduction method as a one-kettle reaction; that is to say, no isolation of the intermediate reduction product is necessary.

This method not only constitutes a saving in the reducing agent, but also rather unexpectedly depresses the tendency of aniline formation to less than 1%. Yields of hydrazobenzene amounting to as high as 99% of theory have been obtained while following this method.

The reactions which are undergone in producing hydrazobenzene as above may be depicted as follows:

(1)
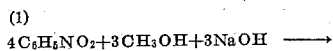

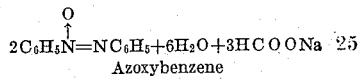

(2)
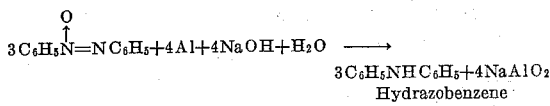

It is apparent from these reactions that this process requires only 40% of the aluminum used in the process depicted by the first set of equations given above. The remainder of the hydrogen is furnished by the methanol. Since methanol costs much less than aluminum, the economy of the process speaks for itself. It should also be noted that methanol furnishes more hydrogen per pound than does even aluminum.

The alkali utilized in the reduction may be a water-soluble strong inorganic alkali, such as sodium hydroxide, sodium carbonate, potassium hydroxide, lithium hydroxide, potassium carbonate, and the like. Because of its cheapness and general availability, however, sodium hydroxide represents the preferred alkali for the process. The quantity of the alkali employed generally ranges from 50 to 150% by weight of the nitroaryl compound subjected to the reduction.

As is apparent from what has been said, the reduction proceeds very efficiently with the aluminum plus zinc compound as the effective reduction agent. We have also ascertained, however, that the reduction is greatly promoted if there be added to the reaction medium minute quantities ranging from about .2 to 2% by weight of the nitroaryl compound being reduced of the metal or a salt of cadmium, lead or mercury. These metals or salts very effectively speed up the reaction rate and particularly aid in the reduction of the last traces of the azoaryl compound to the corresponding hydrazo derivative. Examples of salts which we employed in this relationship are cadmium, lead and mercury sulfates, cadmium, lead and mercury acetates, cadmium, lead and mercury chlorides, cadmium, lead and mercury nitrates and the like. The effect of these salts is clearly one of a promoter for the reduction since it does not appear that they take any part in the reaction, yet their influence is felt in the speed and character with which the reduction is obtained. These materials are promotors and are not equivalent to the zinc compound, which is also necessary.

It might be noted in this connection that there are other salts which if incorporated in the reaction mixture seem to poison the activity of the aluminum rather than to enhance it. Examples of such salts, the presence of which should be avoided, are sodium sulfide, salts of iron or of manganese. If these be present even in traces, it is difficult, if not impossible, to completely reduce the azo derivative although it appears that some hydrazo compound is formed. The completion of the reaction is evidenced by the formation of the white solid hydrazo body, and where these catalyst poisons are present, the red color of the azo compound persists indefinitely. Despite the deleterious effect of the iron salts, however, the reaction seems to proceed satisfactorily enough in an iron vessel.

A further finding which we have made and which contributes to the overall efficiency of the process is that the final reduction of the azo compound to the hydrazo compound is facilitated by the utilization of small amounts of chlorobenzene. Chlorobenzene appears to operate as a solvent but even so it insures complete reduction to the desired hydrazo body. The quantity of the chlorobenzene employed will usually amount to from about 10 to 25% by weight of the nitro compound employed as the parent product.

The invention is further explained by the following examples which are illustrative and not limitative of the invention.

*Example 1*

A caustic solution is prepared by dissolving 54 parts of sodium hydroxide in 200 parts of water. To this is added with stirring 0.5 part of zinc oxide and stirring is continued until a clear solution results. After the zinc oxide has dissolved, the solution is cooled to 30° C. and 50 parts of nitrobenzene and 25 parts of ethyl alcohol are added. Aluminum metal in the form of thin sheets is then added to the stirred reaction mixture at the rate of approximately 2.5 parts every 15 minutes until 23–25 parts have been added, about 2.5 hours being required. During the addition of the aluminum, the temperature of the reaction mixture is not allowed to rise above 35° C. by applying external cooling.

As the reaction proceeds, the reaction mixture, which is an emulsion and which is initially lemon yellow, changes to orange, and then to yellow, orange, red and dark red. When the dark red, or azo stage is reached, the azobenzene comes out of the emulsion as a soft, dark red solid. As the reduction continues, this is gradually replaced by a light yellow or white solid which is the hydrazobenzene.

The hydrazobenzene produced by this method will float at the surface of the reaction mixture and, at this stage, the alkaline aqueous reaction mixture is withdrawn through a valve at the bottom of the reactor and the product held in the reactor. The hydrazobenzene is washed with dilute acid, dilute alkali, or water, as desired. It is then ready for rearrangement to benzidine. Yields from 85 to 95% of theory are obtained.

*Example 2*

In a 500 ml. flask equipped with thermometer, agitator and reflux condenser were placed 67 parts of methyl alcohol (2.1 moles) and with stirring 86 parts of sodium hydroxide (2.15 moles), 5 parts of zinc oxide, 100 parts of nitrobenzene (0.812 mole) and 16.5 parts of chlorobenzene are added. The mixture is heated to 85° C. The temperature continues to rise to 95–97° C. and the mixture begins to reflux. After 15–20 minutes the heat of reaction is no longer sufficient to keep the mixture at reflux temperature and the flask is heated for 3 hours at 95–97° C. The mixture is cooled to 85° C. and to it is added slowly through the condenser 150 parts of water in which is dissolved 0.3 part of cadmium sulfate. After cooling to 65–70° C., 20 parts of granular aluminum, fine enough to pass a 20-mesh screen, are added at the rate of 5 parts every 15 minutes. The heat of reaction keeps the mixture at 65–70° C. with some external cooling during the addition of aluminum. The reaction mixture is heated and stirred vigorously for approximately 2 hours at 65–70° C. The crystalline mass is light yellow in color at this time. It is then heated to reflux temperature, about 77–78° C., and in 20 to 30 minutes the hydrazo compound becomes white. The solvents are recovered by distillation. The residue is cooled to 25° C. and the hydrazobenzene crystals are collected on a 200-mesh screen and washed free of alkali with water and dried at 50° C. A yield of 72.5–73.5 parts of 97–98% of the theoretical yield of hydrazobenzene, M. P. 124–125° C., is obtained. The mother liquor and wash liquor contain less than 1% of aniline.

The distillate may be used for the next reaction without further purification simply by making up the losses of methanol and chlorobenzene.

*Example 3*

The same type of equipment is used as in Example 2. 108 parts of sodium hydroxide and 5 parts of zinc oxide are added to 200 parts of water. The solution is cooled to 50° C. and 100 parts of nitrobenzene and 50 parts of methyl alcohol are added. Aluminum granules (30 mesh and finer) are then added at the rate of 5 parts every 15 minutes at 45–50° C. until 30 parts have been added. The reaction mixture is then diluted with 200 parts of water and 20 parts of additional aluminum are added at the same rate and temperature as before. Stirring is continued for 3 hours at 45–50° C. 79 parts of methyl alcohol are then added and the mixture stirred at 45–50° C. for 2 hours longer. 68.5 parts (91.5% of theory) of white hydrazobenzene are separated from the mixture by screening as in Example 2. The mother liquor and wash liquor contain about 7.5% aniline.

*Example 4*

In this reaction all the conditions of Example 3 are repeated excepting that 50 parts of isopropyl alcohol are substituted for the original charge of methanol and no more alcohol is subsequently added. 55 parts of aluminum are necessary for this reaction. The yield of hydrazobenzene in this reaction is 74%.

*Example 5*

86 parts of sodium hydroxide and 5 parts of zinc oxide are dissolved in 150 parts of water containing 0.3 part of cadmium sulfate. The mixture is cooled to 65° C. and 67 parts of methyl alcohol, 16.5 parts of chlorobenzene and 111 parts of o-nitrotoluene are added, and with good agitation 30 parts of aluminum granules are added at the rate of 2.5 parts every 10 minutes. The reaction mixture is held at the following temperatures during the addition of aluminum. For the first 5 parts, 80–82° C.; the next 7.5 parts, 75° C.; the remaining 17.5 parts, 65–70° C. Stirring is then continued at 65–70° C. for 1½ to 2 hours. 15 parts of aluminum granules are then added at 60–65° C. at the rate of 5 parts every 25 minutes. After stirring for approximately 2 hours, after the final addition of aluminum, 77.9 parts (90.4% of theory) of white hydrazotoluene are obtained.

*Example 6*

43 parts of sodium hydroxide and 2.5 parts of zinc oxide are dissolved in 75 parts of water containing 1.25 parts of lead acetate.

The mixture is cooled to 65° C. and 39.5 parts of methyl alcohol, 11 parts of chlorobenzene and 62 parts of o-nitroanisole are added. With vigorous agitation, 15 parts of aluminum granules are added at 65–70° C. at the rate of 2.5 parts every 10 minutes. Stirring is continued at 65–70° C. for 1½ to 2 hours. 25 parts of water and 32.5 parts of methyl alcohol are then added and 10 parts of aluminum are added gradually during a period of 1½ hours at 55–60° C. 8 parts of methyl alcohol are added and 5 more parts of aluminum. After about ½ hour, the temperature is raised to 65–70° C. and held there until a colorless hydrazo is obtained. At this temperature and in the presence of the solvents, the product is not a solid. By distilling off the solvents and slowly cooling the still residue, 43.2 parts (87% of theory) of colorless crystals of hydrazoanisole are obtained.

*Examples 7–8*

Examples 2 and 5 are repeated without the use of cadmium sulfate or any of the promoters previously mentioned. The hydrazo derivatives are light orange or yellow, indicating incomplete reduction of azobenzene.

*Examples 9–10*

Examples 2 and 5 are repeated in the absence of chlorobenzene. The yield is lowered by the presence of unreacted azobenzene.

*Example 11*

50 parts of sodium hydroxide, 5 parts of zinc oxide and 83.5 parts of o-nitrobenzoic acid (100%) are added to 150 parts of water containing 0.3 part of cadmium sulfate. The mixture is heated to 102–103° C. and with stirring 30 parts of aluminum granules are added in small amounts over a period of 3 hours. After each addition, the temperature rose 2–3° C. and was allowed to subside before the next addition was made. The color changes, typical of these reactions, is noted, and about 2½ hours after all the aluminum is added, the color is gray. The reaction mixture is diluted with 800 parts of water and filtered. The hydrazo is not isolated from the filtrate but is immediately rearranged to benzidine-3,3'-dicarboxylic acid which is obtained in a yield of 63% of theory.

We claim:

1. The process of reducing nitrobenzene to hydrazobenzene which comprises adding nitrobenzene to an aqueous solution of sodium hydroxide and a small quantity of zinc oxide, adjusting the reaction temperature to one ranging from 25 to 80° C., and adding aluminum metal portionwise to the reaction mixture.

2. The process of reducing nitrobenzene to hydrazobenzene which comprises heating nitrobenzene with methyl alcohol, sodium hydroxide and a small quantity of zinc oxide to a temperature of about 85° C., adding a small amount of cadmium sulfate to the reaction mixture, cooling the reaction mixture to a temperature of about 65 to 70° C., and gradually adding to the reaction mixture granular aluminum to effect the desired reduction.

3. The process as defined in claim 2 wherein the reduction is effected in the presence of chlorobenzene.

4. In the process of reducing nitroaromatic compounds to the corresponding hydrazo aromatic compounds by treatment with a reducing agent in the presence of an alkaline medium, the improvement comprising employing as the reducing agent aluminum and a small quantity of an alkali-metal zincate formed from a zinc compound selected from the group consisting of zinc, zinc oxide, zinc hydroxide, zinc sulfate, zinc chloride, zinc nitrate, zinc acetate and zinc oxalate.

5. The process as defined in claim 4 wherein the reduction is effected at a temperature ranging from about 0 to about 100° C.

6. The process as defined in claim 4 wherein the zinc compound is present in an amount ranging from about 0.5 to 6% based on the weight of the nitroaromatic compound subjected to reduction.

7. The process as defined in claim 4 wherein the alkaline medium is a solution of sodium hydroxide.

8. The process as defined in claim 4 wherein the reduction is promoted by the utilization of a small quantity of a water-soluble salt selected from the class consisting of the salts of mercury, lead and cadmium.

9. The process as defined in claim 4 wherein the alkaline medium contains a low molecular weight water-soluble saturated aliphatic alcohol.

10. The process as defined in claim 9 wherein the reduction is promoted by the utilization of a small quantity of a water-soluble salt selected from the class consisting of the salts of mercury, lead and cadmium.

11. The process as defined in claim 9 wherein the reduction is effected in the presence of chlorobenzene.

12. The process of reducing nitrobenzene to hydrazobenzene which comprises reducing the nitrobenzene to the azoxy stage by means of a reaction mixture essentially comprising methanol and sodium hydroxide and completing the reduction of the azoxybenzene to the corresponding hydrazo compound in alkaline solution while utilizing as the reducing agent aluminum and a small quantity of an alkali-metal zincate formed from a zinc compound selected from the group consisting of zinc, zinc oxide, zinc hydroxide, zinc sulfate, zinc chloride, zinc nitrate, zinc acetate and zinc oxalate.

13. The process as defined in claim 1 wherein the reaction mixture contains a low molecular weight water-soluble saturated aliphatic alcohol.

14. The process of reducing nitrotoluene to hydrazotoluene which comprises gradually adding aluminum to an aqueous mixture comprising nitrotoluene, methanal, chlorobenzene, sodium hydroxide, cadmium sulfate and a small quantity of zinc oxide, and maintaining the temperature of the mixture at from about 60 to about 82° C. during and after said addition until the desired reduction is complete.

15. The process of reducing nitroanisole to hydrazoanisole which comprises gradually adding aluminum to an aqueous mixture comprising nitroanisole, methanol, chlorobenzene, sodium hydroxide, lead acetate and a small quantity of zinc oxide, and maintaining the temperature of the mixture at from about 55 to about 70° C. during and after said addition until the desired reduction is complete.

16. The process of reducing nitrobenzoic acid to hydrazobenzoic acid which comprises gradually adding aluminum to an aqueous mixture comprising nitrobenzoic acid, sodium hydroxide, cadmium sulfate and a small quantity of zinc oxide, and maintaining the temperature of the mixture at from about 100 to about 106° C. during and after said addition until the desired reduction is complete.

17. The process of reducing nitrobenzene to hydrazobenzene which comprises reducing the nitrobenzene to the azoxy stage by means of a reaction mixture essentially comprising methanol and sodium hydroxide and completing the reduction of the azoxybenzene to the corresponding hydrazo compound in alkaline solution while utilizing as the reducing agent aluminum and a small quantity of zinc oxide.

DONALD E. SARGENT.
GEORGE WESLEY PEDLOW, JR.

REFERENCES CITED

The following references are of record in the file of this patent:

FOREIGN PATENTS

| Number | Country | Date |
|---|---|---|
| 46,252 | Germany | Jan. 23, 1889 |
| 3,393 | Great Britain | of 1898 |
| 493,960 | Great Britain | Oct. 18, 1938 |

OTHER REFERENCES

Wislicenus: "J. Prak. Chem." Series 2, vol. 54 (1896).